United States Patent

Strümpler et al.

[11] Patent Number: 5,925,467
[45] Date of Patent: *Jul. 20, 1999

[54] ELECTRICALLY AND THERMALLY CONDUCTIVE PLASTIC AND USE OF THIS PLASTIC

[75] Inventors: Ralf Strümpler, Gebenstorf; Friedrich König, Oberbözberg, both of Switzerland

[73] Assignee: ABB Research Ltd., Zurich, Switzerland

[ * ] Notice: This patent issued on a continued prosecution application filed under 37 CFR 1.53(d), and is subject to the twenty year patent term provisions of 35 U.S.C. 154(a)(2).

[21] Appl. No.: 08/654,127

[22] Filed: May 28, 1996

[30] Foreign Application Priority Data

Jul. 14, 1995 [DE] Germany .......................... 195 25 692

[51] Int. Cl.⁶ .............. B32B 27/20; H01B 1/06; C08K 3/10
[52] U.S. Cl. ............... 428/426; 428/411.1; 428/500; 428/698; 252/512; 252/518; 252/519; 252/520; 310/259; 524/401; 524/403; 524/413; 524/432; 524/437
[58] Field of Search ................... 252/512, 518, 252/519, 520; 524/401, 403, 413, 432, 437; 428/697, 698, 426; 310/259

[56] References Cited

U.S. PATENT DOCUMENTS

| | | | |
|---|---|---|---|
| 4,845,343 | 7/1989 | Aune et al. | 219/545 |
| 5,106,538 | 4/1992 | Barma et al. | 252/518 |
| 5,276,080 | 1/1994 | Oku | 524/432 |
| 5,414,403 | 5/1995 | Greuter et al. | 338/22 R |
| 5,602,520 | 2/1997 | Baiatu et al. | 338/22 R |

FOREIGN PATENT DOCUMENTS

| | | |
|---|---|---|
| 1188687 | 3/1965 | Germany . |
| 2413475 | 1/1975 | Germany . |
| 3539509A1 | 4/1989 | Germany . |
| 3932343A1 | 4/1990 | Germany . |
| 4134839A1 | 4/1992 | Germany . |
| 4219064A1 | 12/1993 | Germany . |
| 4324062A1 | 1/1995 | Germany . |
| 4327620A1 | 2/1995 | Germany . |
| 4333673A1 | 4/1995 | Germany . |
| 5-25323 | 2/1993 | Japan . |

Primary Examiner—Tae Yoon
Attorney, Agent, or Firm—Burns, Doane, Swecker & Mathis, L.L.P.

[57] ABSTRACT

The electrically and thermally conductive plastic contains a polymer and a filler embedded in the polymer, based on a semiconducting material having by doping a predetermined intrinsic electrical conductivity. The filler content is chosen such that the electrical conductivity of the plastic remains largely unchanged in the case of an increase in the filler fraction.

This plastic is distinguished by high thermal and electrical— but nonmetallic—conductivity and can be used advantageously for embedding the carrier material of a laminate serving in electrical machine construction for supporting the stator windings of large rotating machines.

12 Claims, 2 Drawing Sheets

_5,925,467_

ELECTRICALLY AND THERMALLY CONDUCTIVE PLASTIC AND USE OF THIS PLASTIC

BACKGROUND OF THE INVENTION

1. Field of the Invention

The invention proceeds from an electrically and thermally conductive plastic based on a polymer and a filler embedded in the polymer. Such a plastic is a suitable material for electrodes for controlling electric fields or for components in which undesired electrostatic charges are to be avoided. In addition to the polymer, as a filler this plastic generally contains carbon black and then has an electrical resistivity, which according to the carbon black content lies between 1 and $10^{16}$ [Ω·cm].

2. Discussion of Background

An electrically and thermally conductive plastic based on polypropylene and carbon black is described by R. Gilg "Russ für leitfähige Kunststoffe" [Carbon black for conductive plastics] in a special reprint from: Kunststoffberater 22, 262 (1977) and 22, 3312 (1977), Kunststoff-Verlag GmbH & Co, Isernhagen. If this plastic is used as a material for cable shieldings or control electrodes, it should have a resistivity typically lying between $10^2$ and $10^{14}$ [Ω·cm]. In this range, the resistivity, or the electrical conductivity of the plastic, changes greatly when there is a slight change in the carbon black fraction. For example, in the case of an increase in the carbon black fraction of about 1% by weight, the resistivity may be reduced from $10^{12}$ [Ω·cm] to $10^4$ [Ω·cm]. Owing to this strongly nonlinear dependence of the electrical resistivity, or the electrical conductivity, on the amount of carbon black, it is difficult to produce in a reproducible way an electrically conductive plastic based on polymer and carbon black which has an exactly defined electrical conductivity. In addition, the electrical conductivity depends on the microstructure of the carbon black distribution in the plastic. Since generally high shearing forces occur during the production of the plastic, the sometimes reticularly-formed structure of the carbon black may be destroyed. Moreover, if a polymer based on a thermoset is used, carbon black particles may agglomerate locally on account of crosslinking reactions and, as a result, adversely affect the homogeneity of the plastic quite considerably.

SUMMARY OF THE INVENTION

Accordingly, one object of the invention, as it is set out in patent claims 1 and 8, is to provide a novel electrically and thermally conductive plastic of the type mentioned at the beginning which has an exactly defined electrical conductivity and nevertheless can be produced in a simple and reproducible way, and at the same time to specify a preferred use of this plastic.

The plastic according to the invention is distinguished in that not only can it be produced in a simple way by choice of a suitable filler, but its electrical conductivity is determined merely by suitable setting of the intrinsic electrical conductivity of the filler, largely irrespective of the production process. Thus, by greater or lesser doping of semiconducting material, a plastic having a predetermined electrical conductivity can be produced in a simple and reproducible way. When doing so, the filler content is chosen to be high enough that the electrical conductivity of the plastic remains largely unchanged in the case of an increase in the filler fraction, thus precluding a nonlinear change in the electrical conductivity in the case of a slight increase in the filler fraction.

The filler content is generally greater than 30 percent by volume. If the filler content is greater than 40 percent by volume, the plastic has, with a high degree of certainty, a virtually constant electrical conductivity even in cases of fluctuations of the filler fraction in the percent range, since the percolation threshold leading to a nonlinear change in the electrical conductivity cannot be reached.

With particular advantage, the semiconducting material is a ceramic, in particular based on $BaTiO_3$, CdS, Si, SiC, $SnO_2$, $SrTiO_3$, $TiO_2$, $Y_1Ba_2$, $Cu_3O_{7-x}$ and/or ZnO. On the one hand, the plastic then has outstanding mechanical properties by virtue of the large filler content. On the other hand, the plastic is then also distinguished by a good thermal conductivity and a low heat expansion coefficient. This is a consequence of the material properties of ceramic semiconductors. Typical values of the thermal conductivity and of the heat expansion coefficient are for ZnO 54 [W/mK] at 300 K and $7.5 \cdot 10^{-6}$ [$K^{-1}$] and for SiC 63–155 [W/mK] at 400 K and $5.5 \cdot 10^{-6}$ [$K^{-1}$], whereas in the case of a polymer, such as for instance an epoxy, they are up to 0.3 [W/mK] and $50-200 \cdot 10^{-6}$ [$K^{-1}$].

Preferred for use as a dopant is a metal, such as in particular Al, Cr, In, Li, Ti and/or Zr, the metal fraction generally accounting for up to one percent of the weight of the semiconducting ceramic and typically lying in the per mil range.

Since the electrical conductivity is determined primarily by the doping of the semiconducting material, filler can be introduced into the plastic up to the maximum packing density. Thus, optimum thermal conductivity and a low heat expansion coefficient can be achieved. By suitably reducing the filler fraction it is possible to achieve a plastic with a defined electrical conductivity and high thermal conductivity which has a heat expansion coefficient adapted to highly filled insulators on the basis of a polymer (40–50 percent by volume $Al_2O_3$ and/or $SiO_2$), such as in particular epoxy.

The polymer is advantageously a thermoplastic, since a thermoplastic can be processed particularly quickly, and since its viscosity generally increases abruptly below its melting temperature. Instead of a thermoplastic, however, a thermoset or an elastomer may also be used as the polymer.

The plastic may be produced from the polymer and the electrically semiconducting material in a conventional way, for instance by mixing and extruding or pressure diecasting or injection molding.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Test samples of electrically conductive plastic were prepared from a low-density thermoplastic as the polymer and semiconductor material. The two materials were mixed with each other for about 15 minutes at about 130° C. in a shearing mixer. Material samples were taken from the high-viscosity mixture obtained and were hot-pressed at about 150° C. and a pressure of about 28 MPa into test samples for measuring the electrical and thermal conductivity.

Used as the thermoplastic was a low-density polyethylene sold by the company BASF AG, Lugwigshafen, under the trade name Lupolen 1800 SP 15. The semiconductor material was pulverulent, either zinc oxide (ZnO) doped with about 500 ppm aluminum or undoped. The doped ZnO was formed by spray-drying an aqueous suspension, containing ZnO powder of particle sizes up to 200 $\mu$m, made into a paste, and dissolved aluminum acetate or nitrate, and subsequent heating of a powder formed during the spray-drying to about 1200° C. over three hours. Depending on the conditions during the spray-drying, the powder formed has particles of diameters of up to 300 $\mu$m. The shape of the particles may be spherical or elongate in a preferential direction as well as compact or hollow. During heating, the aluminum acetate or nitrate decomposes and the metallic aluminum formed diffuses into the ZnO.

By suitable choice of the sintering temperature, the sintering atmosphere and/or the amount and nature of the dopant, the value of the intrinsic electrical resistivity of the doped ZnO or of some other doped semiconducting material can be modified and set in a wide range. For ZnO doped with aluminum, the following values of the electrical resistivity are obtained in dependence on the dopant content:

| Sample | Aluminum content [ppm] | Electrical resistivity [$\Omega \cdot$ cm] |
|---|---|---|
| 1 | 0 | 1321 |
| 2 | 50 | 10 |
| 3 | 200 | approx. 0 |
| 4 | 500 | 6 |
| 5 | 2000 | 59 |
| 6 | 5000 | 131 |

Figure 1:
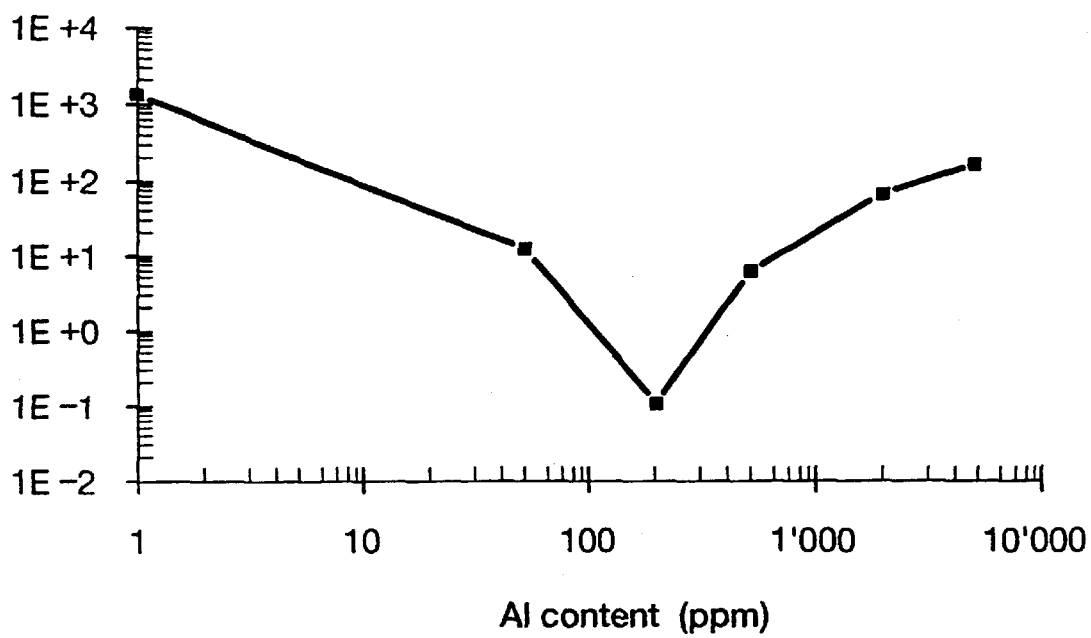
FIG. 1 shows a diagram in which the electrical resistivity of a zinc oxide ceramic doped with aluminum is represented as a function of the dopant content.

Referring now to the drawings, in FIG. 1 it is shown that a particularly small electrical resistivity and, accordingly, a particularly good electrical conductivity are achieved with doping amounts greater than 10 and less than 1000 ppm. An aluminum-doped zinc-oxide ceramic which has about 200 ppm aluminum is particularly favorable. By altering the sintering conditions of the ceramic, these values can optionally be changed.

It is particularly advantageous if the powder comprising amorphous or polycrystalline particles has large and small particles, since a particularly high degree of filling of the plastic and consequently particularly good mechanical, electrical and thermal properties are then achieved. For example, the powders may have particles of sizes less than 50 $\mu$m, which are then arranged in gaps between particles of sizes up to several hundred $\mu$m.

The electrical resistivity and the thermal conductivity were measured on test samples having a filler content of 0, 5, 10, 15, 20, 25, 30, 35, 40 and 50 percent by volume. The results of the resistance measurements are indicated in FIG. 2.

Figure 2:
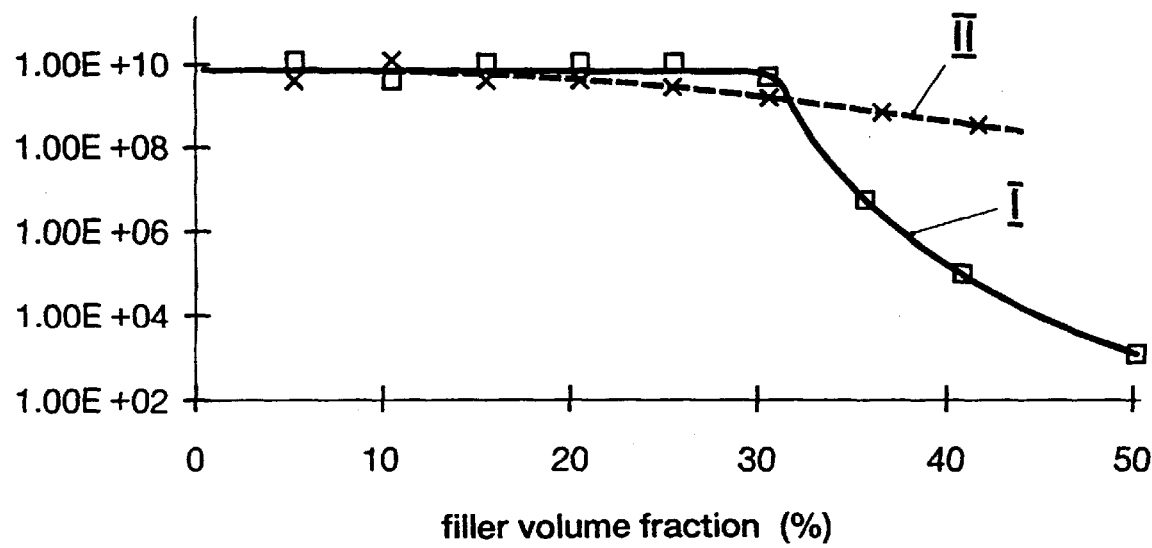
FIG. 2 shows a diagram in which the electrical resistivity of a plastic according to the invention and of a comparative plastic is respectively represented as a function of the filler fraction, measured in percent by volume.

In FIG. 2, the functional dependence of the electrical resistivity on the filler content is denoted by I or II, depending on whether the plastic contains doped ZnO according to the invention or just undoped ZnO. Measurements were taken at a frequency of 1 kHz using an impedance analyzer of the Hewlett Packard company of the type HP 4274 A. It can be seen from function I that up to a filler fraction of about 30 percent by volume, the electrical resistivity of the samples investigated is virtually steady at $10^{10}$ [$\Omega \cdot$cm]. Only at a filler fraction greater than about 30 percent by volume is the electrical resistivity reduced drastically and, above a filler fraction of about 50 percent by volume, remains virtually constant with a value of about $3 \cdot 10^3$ [$\Omega \cdot$cm]. On the other hand, in the case of the plastic filled with undoped ZnO (function II), the electrical resistivity which is steady at $10^{10}$ [$\Omega \cdot$cm] at filler fractions of up to 30 percent by volume is reduced only very little and at a filler fraction of 40–50 percent by volume is just $10^8$–$10^9$ [$\Omega \cdot$cm], much too small a value of the electrical resistivity of the plastic to perform shielding or field-controlling tasks.

The measurements of the thermal conductivity showed that plastics according to the invention with a filler fraction of 30 percent by volume have a thermal conductivity of 0.61 [W/mK] and with a filler fraction of 40 or 50 percent by volume a thermal conductivity of 0.92 or 2 [W/mK], respectively. Plastics according to the invention therefore have a thermal conductivity which is 2 to 6 times higher than plastics according to the prior art, for instance based on carbon black as the filler, having a thermal conductivity of typically 0.30 [W/mK].

Figure 3:
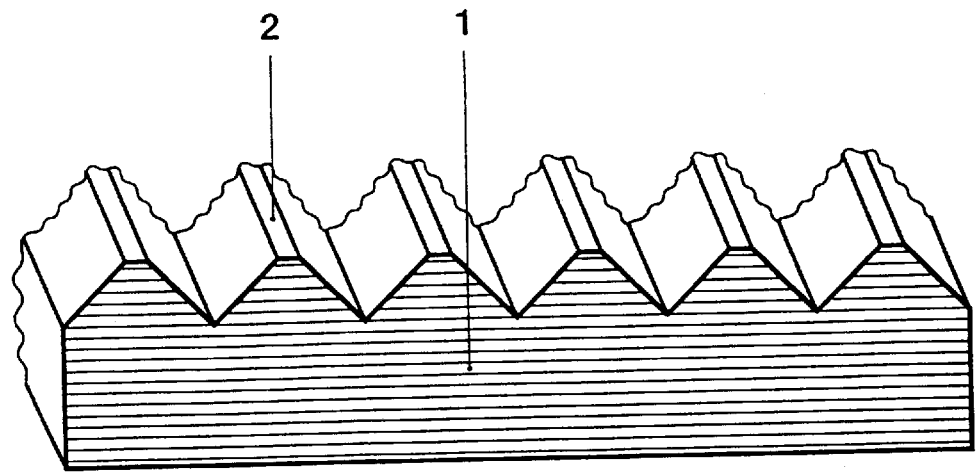
FIG. 3 shows a plan view of a section through a plastics laminate comprising a stack of glass cloths and a plastic bonding the layers of the stack to one another, according to the invention.

A preferred use of the plastic according to the invention is represented in FIG. 3. This use concerns a laminate with a polymer matrix embedding a carrier material. The laminate comprises layers of cloth 1 which are stacked one on top of the other and are coated with the plastic according to the invention. The cloth comprises, for example, glass fibers and has, for example, a weight per unit area of about 23 [g/m$^2$]. The cloth was impregnated in a suspension which contained 100 ppm dissolved polysulfone and ZnO powder doped with 500 ppm aluminum and uniformly distributed in the polysulfone solution. To achieve dense packing, the ZnO powder comprised two fractions. The larger fraction, with 600 ppm, contained particles of sizes between 10 and 200 $\mu$m, while the smaller fraction, with 100 ppm, had particles of sizes up to 63 $\mu$m. The impregnated cloth was dried at temperatures up to 100° C. for about 2 hours. The coated cloth thus obtained had a thickness of about 0.3 mm.

A plurality of layers 1 of the coated cloth were stacked one on top of the other and pressed at temperatures of about 250° C. and a pressure of about 5 MPa to form a laminate. Sample pieces for measuring purposes were prepared from the laminate thus produced. The following properties of the laminate were determined on the basis of these sample pieces:

| | |
|---|---|
| Density | 3.21 [g/cm$^2$] |
| Thermal conductivity | 2.06 [W/mK] |
| Electrical resistivity at room temperature | 3 [k$\Omega \cdot$ cm] |
| Thermal stability for long-term stress | 160° C. |
| Volume fraction of the ZnO in the plastic | 60% |

In comparison with laminates according to the prior art, having thermal conductivities of typically 0.3 [W/mK], the thermal conductivity is manifestly improved by a factor of about 7. By use of the plastic according to the invention, in addition an electrical conductivity prescribed for the laminate can easily be maintained within a narrow tolerance range. Moreover, the laminate can be produced in a simple and easy to control production process. When executing the production process, at least one surface of the laminate may be provided with a structure 2, which can be seen from FIG. 3.

Such a laminate may be used in electrical machine construction as a material of high thermal stability (insulation class F or higher) and high thermal conductivity as well as low electrical—but nonmetallic—conductivity (electrical resistivity typically between 1 and 10 k$\Omega$ to avoid external corona discharges). In particular it may serve as slot wedging for supporting winding bars in slot channels of a large rotating electrical machine, such as turbogenerators or hydrogenerators.

Figure 4:
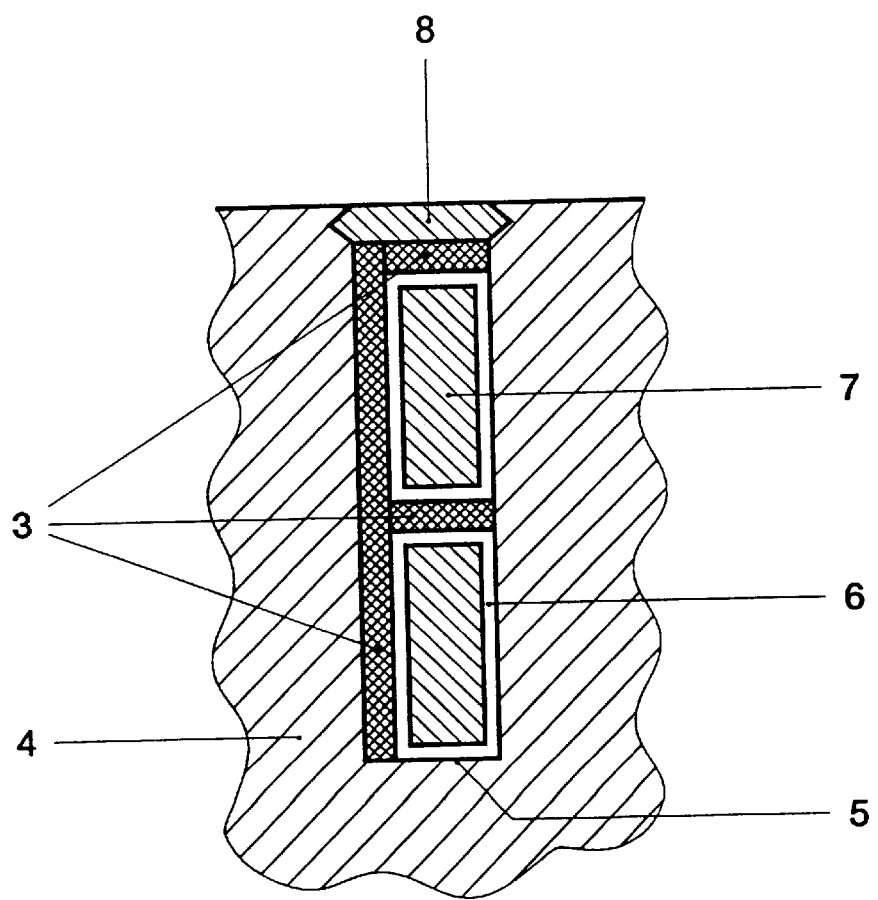
FIG. 4 shows a plan view of a section through a slot of a stator core assembly of a generator, said slot receiving winding bars and a slot wedging containing the laminate according to FIG. 3, the section being taken transversely with respect to the axes of the bars.

In FIG. 4, a laminate serving as slot wedging 3 and containing the electrically semiconducting plastic according to the invention is arranged in a slot 5 let into a stator core assembly 4 of a generator. The slot 5 further contains two winding bars 7, which are electrically insulated with respect to each other and with respect to the core assembly by means of a main insulation 6. The winding bars 7 are firmly anchored in the slot 5 by the slot wedging 3 and a slot wedge 8 closing off the slot 5 from the outside. By choosing glass fiber as the cloth and polysulfone as the polymer, the laminate forming the slot wedging 3 has at least a compressive strength corresponding to the main insulation 6, even at operating temperature of the generator. The current flow in the winding bars 7 causes resistive and inductive losses. These losses can be passed via the main insulation 6 directly and via the slot wedging 3 indirectly to the stator core assembly 4. By use of a slot wedging 3 with good heat conduction, according to the invention, particularly effective heat dissipation from the winding bars 7 is achieved. The winding bars 7 and the stator core assembly 4 are at electric potentials which differ considerably from each other. To prevent the possibility of the main insulation 6 being destroyed by external discharges, the surface of the main insulation 6 is provided with an electrically semiconducting coating and the good electrical conductivity of the laminate forming the slot wedging 3 is preserved.

In the production of the laminate, a structure 2, which can be seen from FIG. 3, may be impressed into the laminate surface. Such a structure 2 has the effect of improving the mechanical coupling between the winding bars 7 and the wall of the slot 5 and increasing the heat exchange between the winding bars 7 and the stator core assembly 4.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. A laminate with a thermal conductivity of more than 0.61 W/mK and electrical resistivity between 1 and 10 k$\Omega$·cm comprising a support material embedded in a plastic matrix, the plastic matrix being thermally conductive and comprising polymer material which contains more than 30% by volume of a filler material embedded therein, the filler material being doped semi-conductive ceramic material which has a preset intrinsic electrical conductivity, and the plastic matrix having an electric conductivity which is substantially constant throughout a range in the amount of filler material in the polymer material.

2. The laminate in accordance with claim 1, wherein the filler material comprises particles having sizes smaller than 50 $\mu$m and larger particles having sizes up to several hundred $\mu$m.

3. The laminate in accordance with claim 1, wherein the filler material is doped with a metal.

4. The laminate in accordance with claim 3, wherein the metal is present in an amount no greater than one percent by weight of the ceramic material.

5. The laminate in accordance with claim 4, wherein the filler material consists essentially of zinc oxide ceramic material doped with 10 to 1000 ppm aluminum.

6. The laminate in accordance with claim 1, wherein the polymer material contains no more than 60% by volume of the filler material.

7. The laminate in accordance with claim 1, wherein the semi-conductive material is ZnO doped with aluminum, and the polymer material contains at least 40% by volume of the semi-conductive material.

8. A laminate with a thermal conductivity of more than 0.61 W/mK and electrical resistivity between 1 and 10 k$\Omega$·cm comprising a support material embedded in a plastic matrix, the plastic matrix being thermally conductive and comprising polymer material which contains more than 30% by volume of a filler material embedded therein, the filler material being doped semi-conductive ceramic material which has a preset intrinsic electrical conductivity, and the plastic matrix having an electric conductivity which is substantially constant throughout a range in the amount of filler material in the polymer material, the laminate having a series of grooves in at least one surface thereof.

9. The laminate in accordance with claim 1, wherein the ceramic material is at least one ceramic material selected from the group consisting of $BaTiO_3$, CdS, Si, SiC, $SnO_2$, $SrTiO_3$, $TiO_2$, and ZnO.

10. The laminate in accordance with claim 3, wherein the metal is at least one metal selected from the group consisting of Al, Cr, In, Li, Ti and Zr.

11. The laminate in accordance with claim 1, wherein the support material comprises a plurality of glass fiber sheets and/or the polymer material comprises polysulfone.

12. The laminate in accordance with claim 1, comprising slot wedging in a stator core assembly of a generator.

* * * * *